United States Patent [19]

Seki et al.

[11] Patent Number: 5,301,940

[45] Date of Patent: Apr. 12, 1994

[54] BASEBALL BAT AND PRODUCTION THEREOF

[75] Inventors: Takao Seki, Gifu; Yasuo Sano, Osaka, both of Japan

[73] Assignees: Mizuno Corporation; Takeda Chemical Industries, Ltd., both of Osaka, Japan

[21] Appl. No.: 112,656

[22] Filed: Aug. 27, 1993

Related U.S. Application Data

[63] Continuation of Ser. No. 793,956, Nov. 15, 1991, abandoned.

[30] Foreign Application Priority Data

Nov. 15, 1990 [JP] Japan .................. 2-310198

[51] Int. Cl.⁵ .............................................. A63B 59/06
[52] U.S. Cl. ............................... 273/72 R; 264/258
[58] Field of Search ................. 273/72 A, 72 R, 67, 273/73, 80 R, 80 B; 264/258, 257, 271.1; 525/504; 423/445

[56] References Cited

U.S. PATENT DOCUMENTS

| | | | |
|---|---|---|---|
| 3,830,496 | 8/1974 | Reizer | 273/72 R |
| 4,847,063 | 7/1989 | Smith | 423/445 |
| 4,849,150 | 7/1989 | Kittaka et al. | 264/258 |
| 4,902,760 | 2/1990 | Arita et al. | 525/504 |
| 4,931,247 | 6/1990 | Yeh | 264/258 |

FOREIGN PATENT DOCUMENTS

| | | | |
|---|---|---|---|
| 5643 | 1/1980 | Japan | 273/72 R |
| 62069 | 4/1984 | Japan | 273/72 R |
| 3009273 | 1/1991 | Japan | 273/72 R |

*Primary Examiner*—Mark S. Graham
*Attorney, Agent, or Firm*—Wenderoth, Lind & Ponack

[57] ABSTRACT

A baseball bat having a fiber reinforced outer layer which is formed by a resin injection technique employing a continuous reinforcing fiber and a molding material which cures to provide a crosslinked polyaminoamide resin, a crosslinked epoxy-modified polyaminoamide resin or a crosslinked polyesteramide resin and method for manufacturing such baseball bat.

9 Claims, 2 Drawing Sheets

BASEBALL BAT AND PRODUCTION THEREOF

This application is a continuation of now abandoned application Ser. No. 07/793,956, filed Nov. 15, 1991.

BACKGROUND OF THE INVENTION

This invention relates to a bat used in baseball, and more particularly it relates to a bat made of fiber reinforced resin and a method of producing such a bat.

There is already known a bat used in baseball including soft ball made of fiber reinforced resin. Such a bat is produced usually by placing cloth, roving or braid of continuous fibers impregnated with a thermosetting resin in a mold cavity in the form of bat, and then pressing and heating the resin to cure. There is also known a bat which is produced by injection molding of fiber reinforced thermoplastic resin as described in, for instance, Japanese Utility Model Application Laid-open No. 54-134565 and Japanese Patent Publication No. 59-10228.

The conventional bat of fiber reinforced resin as above mentioned uses an epoxy resin or a polyester resin reinforced with continuous fibers, and such a resin provides a solid and light bat. However, the production needs complicated and laborious steps. For instance, it is complicated and laborious to prepare prepregs and laminate the prepregs to form a preformed material. The conventional molding of such a preformed material needs a molding cycle as long as about 20-40 minutes at temperatures of about 100°-150° C. Thus, the conventional method needs a large number of molds for mass production, and hence the resultant bats are costly.

The conventional bats have further defects that they are rather brittle on account of properties which the resin as above mentioned originally has, although they are hard, and in addition they are of rather small vibration damping rate and wear resistance. Moreover, molded materials as molded have many voids on the surface and in the inside to necessitates complicated after treatment. As the case may be, there is obtained a bat having a smaller strength than expected.

On the other hand, there is also known a hollow bat which is produced by injection molding of a thermoplastic resin reinforced with short fibers. However, such a bat is inferior in strength and rigidity to a bat of a thermosetting resin reinforced with continuous fibers. Thus, such a hollow bat needs a reinforced outer layer of a large thickness, or reinforcing ribs in the hollow. This reduces freedom of design remarkably and prevents the production of light bats. Further, the injection molding needs a high molding pressure, and hence needs molds which bear such a high molding pressure, so that the production cost is high.

It is an object of the invention to provide a baseball bat formed of fiber reinforced resin and having a high strength and rigidity.

It is also an object of the invention to provide a method of producing such a bat in a high productivity.

SUMMARY OF THE INVENTION

According to the invention, there is provided a bat having a fiber reinforced outer layer which is formed by a resin injection technique employing a continuous reinforcing fiber and a molding material which cures to provide a crosslinked polyaminoamide resin, a crosslinked epoxy-modified polyaminoamide resin or a crosslinked polyesteramide resin.

Further according to the invention, there is provided a method of manufacturing a bat which comprises:
preparing a core roughly in the form of bat;
winding continuous reinforcing fibers round the core to provide a preformed material;
placing the preformed material in a mold cavity;
injecting a molding material which cures to provide a crosslinked polyaminoamide resin, a crosslinked epoxy-modified polyaminoamide resin or a crosslinked polyesteramide resin into the mold cavity to impregnate the reinforcing fibers therewith; and
curing the molding material in the mold cavity.

BRIEF DESCRIPTION OF THE DRAWINGS

The above and other advantages of the invention will become more apparent in the following description and the accompanying drawings in which.

DETAILED DESCRIPTION

Figure 1:
FIG. 1 is a perspective illustration of a bat of the invention.

The reinforcing fibers used include, for example, inorganic or metal fibers such as glass fibers, carbon fibers, ceramic fibers, boron fibers, tungsten fibers, molybdenum fibers, steel fibers, beryllium fibers and stainless steel fibers, and organic fibers such as polyamide fibers, polyvinyl alcohol fibers and polyester fibers. These fibers may be used singly or jointly. These reinforcing fibers are used preferably in the form of cloth, roving, mat or, biaxial or triaxial braid, and the material may be used singly or jointly. It is preferred that the outer layer contains a plurality of layers of reinforcing fibers, and at least one of the layers, especially the outermost layer, is composed of triaxial braid.

The bat of the invention has an outer layer of a crosslinked resin which is reinforced with such continuous fibers as above mentioned. The crosslinked resin in the invention is a crosslinked polyaminoamide resin, a cross-linked epoxy-modified polyaminoamide resin or a crosslinked polyesteramide resin. In accordance with the invention, these crosslinked resins are produced usually by heating a molding material composed of polyfunctional (usually difunctional) monomeric or oligomeric organic materials in the presence of a catalyst.

More specifically, the crosslinked resin is produced preferably by the reaction of 2,2'-(1,3-phenylene)bis-2-oxazoline with a second polyfunctional (usually difunctional) compound which is selected from the group consisting of an aromatic amine compound having two or more amino groups in the molecule and a carboxylic acid compound having two or more carboxyl groups in the molecule, in the presence of a catalyst. Polyfunctional (usually difunctional) epoxy resins may be used together with the aromatic amine compound.

The crosslinked polyaminoamide resin is obtained, for example, by the reaction of 2,2'-(1,3-phenylene)bis-2-oxazoline with an aromatic diamine compound in the presence of a catalyst, as described in U.S. Pat. No. 4,837,302. There may be mentioned as the aromatic diamine compound, for example, 4,4'-diaminodiphenylmethane, 4,4'-diamino-3,3'-diethyldiphenylmethane, 3,4'-diaminodiphenylether, 4,4'-diaminodiphenylsulfone or 2,2-bis[4-(4-aminophenoxy)phenyl]propane. The catalyst used includes, for instance, a monobromoalkane such as octyl bromide, a monoiodoalkane such as octyl iodide, a dibromoalkane such as 1,4-dibromobutane, an alkyl p-toluenesulfonate such as methyl or ethyl p-toluenesulfonate, 2-bromopropionic acid or its alkyl ester such as methyl or ethyl ester, 2-bromoisobutyric acid or its alkyl ester such as methyl or ethyl ester.

The crosslinked epoxy-modified polyaminoamide resin is obtained, for example, by the reaction of 2,2'-(1,3-phenylene)bis-2-oxazoline with such an aromatic diamine compound as above and a polyfunctional epoxy resin in the presence of a catalyst as above mentioned, as described in U.S. Pat. No. 4,902,760.

In turn, the crosslinked polyesteramide resin is obtained, for example, by the rection of 2,2'-(1,3-phenylene)bis-2-oxazoline with a dibasic carboxylic acid in the presence of a catalyst, as described in U.S. Pat. No. 4,474,942. There may be used as the dibasic carboxylic acid, for instance, glutaric acid, adipic acid, azelaic acid, sebacic acid or dodecanedioic acid. The catalyst used includes, for example, phosphorous acid or an organic phosphite such as diphenyl phosphite, triphenyl phosphite or tris(nonylphenyl) phosphite.

In the connection with the production of the crosslinked resin, the above three United States patents are hereby incorporated into the specification as references to define the resins used in the invention.

The molding material may contain stabilizers, mold releasing agents, colorants, flame retardants or fillers according to the properties of bats required.

According to the invention, the molding material has a viscosity as low as not more than 100 centipoises when it is molded together with reinforcing fibers to form the outer layer of bat, so that there is manufactured a bat which has a fiber content as high as 30–65% by weight. It is most preferred that the molding material has a viscosity of not more than about 30 centipoises. Such a low viscosity molding material is readily distributed throughout the mold cavity, and the reinforcing fibers placed therein are readily wetted and impreganated evenly with such a low viscosity molding material.

The production of a bat according to the invention will now be described with reference to the drawings.

FIG. 1 is a perspective illustration of a bat 1 of the invention. For the production of such a bat, a core roughly in the form of bat is first prepared using a meltable material or a foamed resin. A mandrel of metal may also be used as a core.

Figure 2:
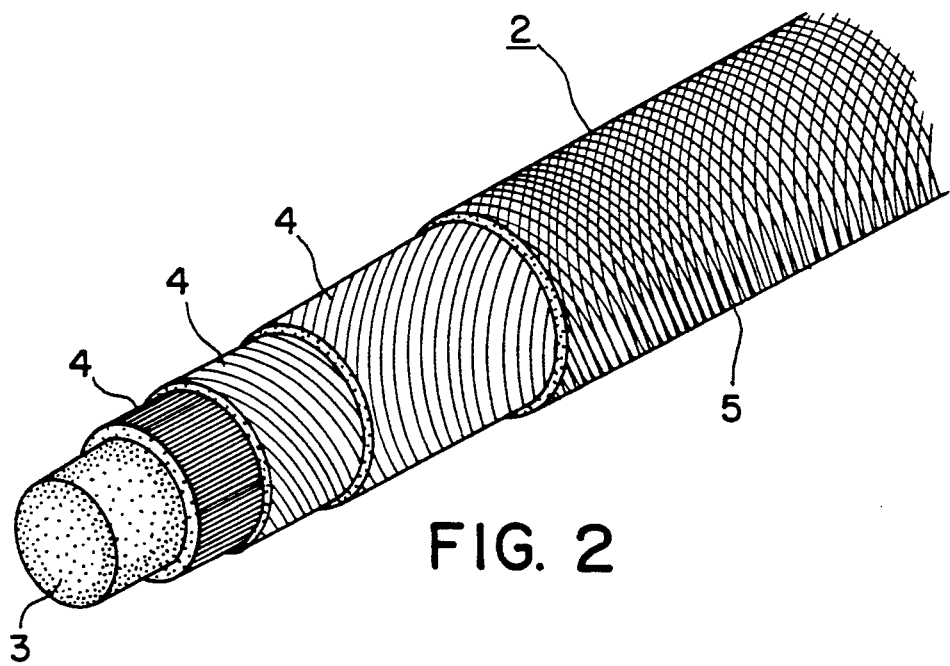
FIG. 2 illustrates an example of a preformed material composed of a core and reinforcing fibers wound therearound.

Then, reinforcing fibers or materials composed of the fibers such as roving, mat, cloth or, diaxial or triaxial braid are wound round the core, to provide a preformed material. FIG. 2 illustrates in detail a preferred example of a preformed material 2 which is composed of a core 3, rovings 4 in three layers and a triaxial sleeve-like braid 5 on the layers of rovings.

Figure 3:
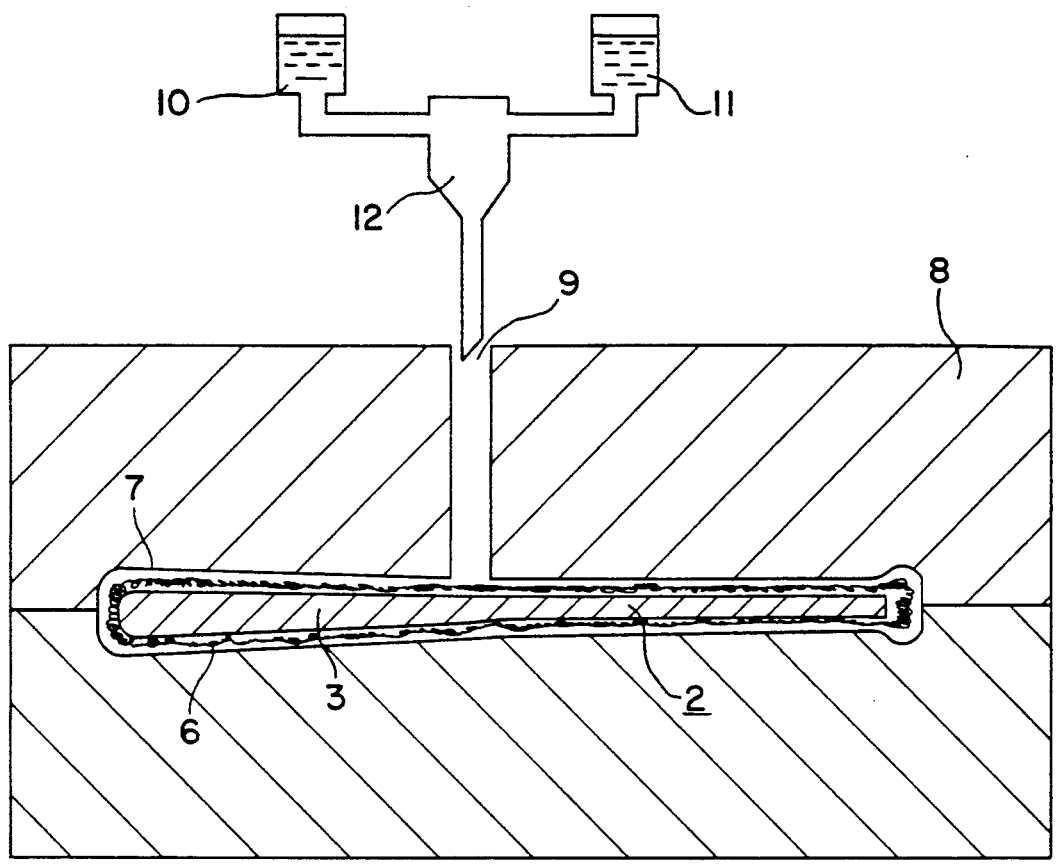
FIG. 3 illustrates production of a bat according to the invention.

As illustrated in FIG. 3, the preformed material 2 is thus composed of a core 3 and continuous reinforcing fibers 6 wound round the core. It is then placed in a cavity 7 formed between a couple of molds 8 which are provided with a resin injection opening 9 through which a molding material is injected into the mold cavity. After placing the preformed material in position in the mold cavity, the molds are clamped and the cavity is evacuated.

The molding material is usually used as a two part molding material. The first component 10 and the second component 11 are admixed in a mixing head 12 of a resin injector and injected into the mold cavity through the injection opening. Thereafter, the molding material is heated under pressure to cure in the mold cavity and provide a molded material. Namely, the bat of the invention is manufactured by a resin injection technique.

In the method of the invention, the molding is carried out usually at temperatures of about 100°–150° C. under pressures of about 5–30 Kg/cm$^2$ for a period of about three to twenty minutes.

The thus obtained molded material is then subjected to after treatment and finishing steps to provide a bat of the invention.

Figure 4:
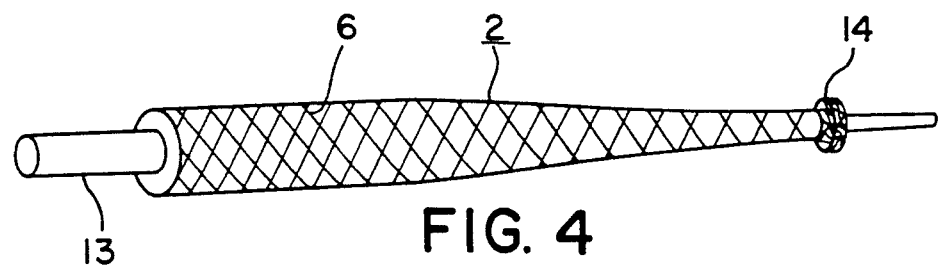
FIG. 4 illustrates a preformed material having a mandrel as a core.

FIG. 4 illustrates a further example of a preformed material 2 which is formed of a mandrel 13 of a metal as a core, braids of fibers 6 wound round the core, and a block 14 of fibers placed at the grip portion.

It is possible to manufacture a hollow bat when a core is formed of a meltable material. After the molding material is cured to provide a molded material, the core is heated, melted and then removed from the molded material to provide a hollow bat. If necessary, the hollow may be filled with other materials. As the meltable material, there may be preferably used an alloy having a melting point of 80°–200° C. containing such a metal as bismuth, lead, tin or cadmium as a main component.

When a mandrel of metal is used as a core, it is pulled out from the resultant molded material, and then a head and a grip are mounted on the molded material to provide a bat. The use of a core of a foamed resin provides a solid bat.

The mandrel can be pulled out from the molded material if the mandrel has the same diameter throughout the length, however it is preferred that the mandrel slightly tapers (at least from about 1/1000 to 0.5/1000) towards the grip portion so that it is more readily pulled out.

As set forth above, the method of the invention is featured by the use of a low viscosity molding material composed of a melt of monomeric or oligomeric materials which cures to form a crosslinked polyaminoamide resin, a crosslinked epoxy-modified polyaminoamide resin or a cross-linked polyesteramide resin. As a further feature, such a molding material is injected into a mold cavity in which a preformed material is placed under a low pressure, and then cured.

Consequently, the molding material is readily distributed throughout the cavity to fully and evenly impregnate the preformed material, so that the method can provide a bat of a fiber content as high as 35–65% by weight, and hence of greatly improved mechanical strength such as bending and compression strength.

In addition, since the molding material has a low viscosity and is injected into a mold cavity under a low injection pressure, the fiber material in the mold cavity is kept in place during the injection of molding material into the cavity, and thus there is obtained a bat having a fiber reinforced outer layer of strength as expected. This permits the production of a bat having an outer layer of reduced thickness and still having a sufficient strength; namely a light bat can be manufactured.

The resultant molded material has substantially no voids on the surface and in the inside, and is excellent in appearance, and needs no laborious aftertreatment. Thus, the method permits mass production of fiber reinforced resin at high productivity.

When a core of meltable material is used or a mandrel of metal is used as a core, such a core can be removed after molding, to provide a light bat.

The invention will now be described in detail with reference to examples, however, the invention is not limited to the examples.

EXAMPLE 1

A bat was manufactured using a molding material which provides a crosslinked polyaminoamide resin and braid of continuous carbon fibers.

A mixture of 2,2'-(1,3-phenylene)bis-2-oxazoline and 4,4'-diaminodiphenylmethane in a weight ratio of 6 to 4 was heated to 120° C. to provide a melt (A) having a viscosity of about eight centipoises as measured at 120° C. with a Brookfield viscometer. Octyl bromide as a liquid (B) had a viscosity of about four centipoises as measured under the same conditions as above. Thus, a two part molding material was prepared.

A core was prepared using a meltable material. Braids of carbon fibers were wound round the core so that the resultant molded material had a fiber content of 50% by weight.

The thus prepared preformed material was placed in a mold cavity, the molds were clamped and the cavity was evacuated. The melt (A) was mixed with the liquid (B) in a weight ratio of 100 to 2.5 (A to B) in an injector and injected into the mold cavity.

The molding was carried out at a temperature of about 130° C. under a pressures of about 10 Kg/cm$^2$ for a period of about four minutes.

EXAMPLE 2

A bat was manufactured using a mold material which provides a crosslinked epoxy-modified polyaminoamide and roving and triaxial braid of carbon fibers.

A mixture of 2,2'-(1,3-phenylene)bis-2-oxazoline and 4,4'-diaminodiphenylmethane in a weight ratio of 3 to 7 was heated to 120° C. to provide a melt (A). A mixture of 2,2'-(1,3-phenylene)bis-2-oxazoline and Epikote 807 (an epoxy resin available from Yuka Shell Epoxy K.K.) in a weight ratio of 2 to 8 was heated to melt at 100° C., and 4% by weight based on the mixture of 1,4-dibromobutane were added to the mixture to provide an liquid (B). Thus, a two part molding material was prepared.

A core of a metable material was prepared. As illustrated in FIG. 2, roving 4 was wound round the core and then triaxial braid 5 as the outermost reinforced layer to provide a preformed material 2 having a fiber content of 50% by weight based on the resultant molded material.

The preformed material was placed in a mold cavity, the molds were clamped and the cavity was evacuated. The melt (A) was mixed with the liquid (B) in an equal weight ratio in an injector and injected into the mold cavity.

The molding was carried out at a temperature of about 125° C. under a pressure of about 10 Kg/cm$^2$ for a period of about ten minutes.

EXAMPLE 3

A bat was manufactured using the same crosslinked epoxy-modified polyaminoamide as in Example 2.

As illustrated in FIG. 4, braid 6 of carbon fibers was wound round a core of a SUS mandrel 13 at an angle of 60° to the axis of the core at a batting portion and at an angle of 20° to the axis of the core at a grip portion. A felt-like block 14 made of carbon fibers roughly in the form of grip was placed at the grip portion, to provide a preformed material 2 having a fiber content of 50% by weight based on the resultant molded material.

The preformed material was placed in a mold cavity, and a molded material was prepared in the same manner as in Example 2. After removal of the core, wood and resin were as head members were glued to the head portion to provide a bat.

What is claimed is:

1. A hollow baseball bat having a fiber reinforced outer layer which is formed by steps comprising:
    preparing a core roughly in the form of a bat;
    winding continuous reinforcing fibers in layers around the core to provide a preformed material wherein at least one of the layers is composed of a triaxial braid and wherein the fibers are used in an amount of 30–65% by weight based on the resultant bat;
    placing the preformed material in a mold cavity;
    while evacuating the mold cavity, injecting thereinto a molding material which contains 2,2'-(1,3-phenylene)-bis-2-oxazoline and at least one polyfunctional compound selected from the group consisting of an aromatic diamine compound, a dibasic carboxylic acid and polyfunctional epoxy compound together with a catalyst and has a viscosity of not more than 100 centipoises when being injected thereby to impregnate the reinforcing fibers therewith;
    curing the molding material in the mold cavity under heating and pressure to form a molded material composed of a fiber reinforced crosslinked resin; and
    removing the core from the molded material.

2. The hollow baseball bat as claimed in claim 1 wherein the core is formed of a mandrel.

3. The hollow baseball bat as claimed in claim 2 wherein the mandrel is formed of a meltable alloy having a melting point of 80°–200° C., and the mandrel is removed from the molded material by melting the mandrel.

4. The hollow baseball bat as claimed in claim 1 wherein the aromatic diamine compound is at least one of 4,4'-diaminodiphenylmethane, 4,4'-diamino-3,3'-diethyldiphenyl-methane, 3,4'-diaminodiphenylether, 4,4'-diaminodiphenylsulfone and 2,2-bis[4-(4-aminophenoxy)phenyl]propane.

5. The hollow baseball bat as claimed in claim 1 wherein the dibasic carboxylic acid is at least one of glutaric acid, adipic acid, azelaic acid, sebacic acid and dodecanedioic acid.

6. The hollow baseball bat as claimed in claim 1 wherein the triaxial braid is in the form of a sleeve.

7. A method of manufacturing a hollow baseball bat having a fiber reinforced outer layer, which comprises:
    preparing a core roughly in the form of a bat;
    winding continuous reinforcing fibers in layers around the core to provide a preformed material wherein at least one of the layers is composed of a triaxial braid and wherein the fibers are used in an amount of 30–65% by weight based on the resultant bat;
    placing the preformed material in a mold cavity;
    while evacuating the mold cavity, injecting thereinto a molding material which contains 2,2'-(1,3-phenylene)-bis-2-oxazoline and at least one polyfunctional compound selected from the group consisting of an aromatic diamine compound, a dibasic carboxylic acid and polyfunctional epoxy compound together with a catalyst and has a viscosity of not more than 100 centipoises when being injected thereby to impregnate the reinforcing fibers therewith;

curing the molding material in the mold cavity under heating and pressure to form a molded material composed of a fiber reinforced crosslinked resin; and removing the core from the molded material.

8. The method as claimed in claim 7 wherein the core is a mandrel formed of a meltable alloy having a melting point of 80°–200° C., and the mandrel is removed from the molded material by melting the mandrel.

9. The method as claimed in claim 7 wherein the triaxial braid is in the form of a sleeve.

* * * * *